(12) United States Patent
Shen et al.

(10) Patent No.: US 10,408,191 B2
(45) Date of Patent: Sep. 10, 2019

(54) WIND PITCH ADJUSTMENT SYSTEM

(71) Applicant: General Electric Company, Schenectady, NY (US)

(72) Inventors: Longhui Shen, Shanghai (CN); Jeffrey Alan Melius, Roanoke, VA (US); Chengjun Wang, Shanghai (CN)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 15/463,031

(22) Filed: Mar. 20, 2017

(65) Prior Publication Data

US 2017/0268485 A1   Sep. 21, 2017

(30) Foreign Application Priority Data

Mar. 21, 2016  (CN) .......................... 2016 1 0159531

(51) Int. Cl.
*F03D 7/02* (2006.01)
*F03D 1/06* (2006.01)
(Continued)

(52) U.S. Cl.
CPC ......... *F03D 7/0224* (2013.01); *F03D 1/0675* (2013.01); *F03D 17/00* (2016.05);
(Continued)

(58) Field of Classification Search
CPC ............ F05B 2270/107; F05B 2260/76; F05B 2270/602; F05B 2260/90; F05B 2270/337;
(Continued)

(56) References Cited

U.S. PATENT DOCUMENTS 5,998,968 A   12/1999  Pittman et al.
6,069,458 A    5/2000  Takehara et al.
(Continued)

FOREIGN PATENT DOCUMENTS

CN    101103468 A   1/2008
CN    100468271 C   3/2009
(Continued)

OTHER PUBLICATIONS

Extended European Search Report and Opinion issued in connection with corresponding EP Application No. 17159735.4 dated Jul. 20, 2017.

*Primary Examiner* — Dominick L Plakkoottam
(74) *Attorney, Agent, or Firm* — Dority & Manning, P.A.

(57) ABSTRACT

Systems and methods for controlling a wind pitch adjustment system associated with a wind turbine system are disclosed. In one embodiment, the wind pitch adjustment system can include a power supply configured to convert an alternating current input signal into a direct current voltage, a controller configured to receive a signal from the power supply, and to provide one or more control commands to a pitch adjustment motor, and a surge stopping device comprising a switching element coupled between the power supply and the controller. The surge stopping device is configured to monitor an input voltage from a grid and to drive the switching element based at least in part on the monitored input voltage, such that the switching element is configured to block current flow through the switching element to the controller when the monitored input voltage is above a voltage threshold.

20 Claims, 4 Drawing Sheets

(51) Int. Cl.
*H02H 3/20* (2006.01)
*H02H 7/08* (2006.01)
*F03D 17/00* (2016.01)

(52) U.S. Cl.
CPC ............ *H02H 3/20* (2013.01); *H02H 7/0838* (2013.01); *F05B 2260/76* (2013.01); *F05B 2270/107* (2013.01); *F05B 2270/337* (2013.01); *F05B 2270/502* (2013.01); *F05B 2270/504* (2013.01); *F05B 2270/602* (2013.01); *Y02E 10/721* (2013.01); *Y02E 10/723* (2013.01)

(58) Field of Classification Search
CPC ............. F05B 2270/502; Y02E 10/723; Y02E 10/721; Y02E 10/763; F03D 7/0224; F03D 17/00; F03D 1/0675; F03D 7/0244; H02H 3/20; H02H 7/0838; H02J 3/386
See application file for complete search history.

(56) References Cited

U.S. PATENT DOCUMENTS

| | | |
|---|---|---|
| 6,806,457 B2 | 10/2004 | Yang |
| 7,183,753 B2 | 2/2007 | Tsuruya |
| 7,582,939 B2 | 9/2009 | Bakran et al. |
| 8,319,651 B2 | 11/2012 | Yin et al. |
| 8,519,693 B2 | 8/2013 | Matthews |
| 8,519,751 B2 | 8/2013 | Kitamura et al. |
| 8,587,266 B2 | 11/2013 | Yang |
| 8,664,788 B1* | 3/2014 | Wagoner ............... F03D 7/0244 290/44 |
| 8,907,569 B2 | 12/2014 | Tran |
| 9,528,495 B2 | 12/2016 | Lopez Rubio et al. |
| 9,654,177 B2 | 5/2017 | Yamamoto |
| 2007/0007588 A1 | 1/2007 | Ishida et al. |
| 2010/0271852 A1 | 10/2010 | Nakamura |
| 2012/0235613 A1* | 9/2012 | Huang ............... B60L 3/0092 318/400.26 |
| 2014/0054892 A1* | 2/2014 | Brown ................. F03D 7/0224 290/44 |
| 2014/0192442 A1 | 7/2014 | Guadiz |
| 2015/0035281 A1 | 2/2015 | Lopez Rubio et al. |
| 2015/0035385 A1* | 2/2015 | Sander ............... H03K 17/0822 307/125 |
| 2015/0062762 A1 | 3/2015 | Fujii |
| 2015/0152843 A1 | 6/2015 | Vetter et al. |
| 2016/0344327 A1* | 11/2016 | Lopez ................. H02P 25/034 |

FOREIGN PATENT DOCUMENTS

| | | |
|---|---|---|
| CN | 102263240 A | 11/2011 |
| CN | 102662121 A | 9/2012 |
| CN | 102157759 B | 3/2013 |
| CN | 103280988 B | 3/2015 |
| CN | 102662121 B | 5/2015 |
| DE | 20 2010 004 045 U1 | 8/2011 |
| EP | 1112896 B1 | 9/2005 |
| EP | 2 589 800 A1 | 5/2013 |
| EP | 2 703 642 A2 | 3/2014 |
| EP | 2711986 A1 | 3/2014 |
| JP | 2001119952 A | 4/2001 |
| JP | 2003168963 A | 6/2003 |
| JP | 2004179244 A | 6/2004 |
| JP | 2006296157 A | 10/2006 |
| JP | 2007068248 A | 3/2007 |
| JP | 4213565 B2 | 1/2009 |
| JP | 2009201331 A | 9/2009 |
| JP | 4407077 B2 | 2/2010 |
| JP | 2010166729 A | 7/2010 |
| JP | 4581892 B2 | 11/2010 |
| JP | 5279200 B2 | 9/2013 |
| JP | 2014010587 A | 1/2014 |
| JP | 5622470 B2 | 11/2014 |
| JP | 5656255 B2 | 1/2015 |
| JP | 5920657 B2 | 5/2016 |
| WO | 2011/104318 A1 | 9/2011 |
| WO | 2015/115145 A1 | 8/2015 |

\* cited by examiner

WIND PITCH ADJUSTMENT SYSTEM

FIELD OF THE INVENTION

The present subject matter relates generally to wind turbine systems, and more particularly to controlling wind pitch control systems associated with a wind turbine system.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. The blade loading is dependent on the wind speed, tip speed ratio and/or pitch setting of the blade. Tip speed ratio is the ratio of the rotational velocity of the blade tip to wind speed. It can be desirable to adjust operation of the wind turbine based on signals indicative of tip speed ratio (e.g. various speed readings) to adjust loading of the rotor blades of the wind turbine and/or to increase energy production of the wind turbine.

To reduce rotor blade loading, various methods and apparatus have been developed to allow the rotor blades to shed a portion of the loads experienced thereby. Such methods and apparatus include, for example, pitching the rotor blades and/or reducing generator torque during operation. Accordingly, many wind turbines include a wind turbine controller that can operate the wind turbine in various ways based on the tip speed ratio wind turbine loading. For instance, under various operating conditions, the wind turbine can adjust the torque of a generator and/or the pitch angle of the rotor blades to adjust the tip speed ratio to meet a desired tip speed ratio setpoint to increase energy capture by the wind turbine.

The pitch angle of a rotor blade can be controlled, for instance, using a wind pitch adjustment system. The wind pitch adjustment system can include a motor, such as a direct current (DC) motor driven by a DC/DC converter. In some implementations, a wind pitch adjustment system includes a DC source, a control circuit, an inverter bridge, and/or a DC bus capacitor bank having one or more capacitor devices.

The wind turbine and/or the pitch adjustment system can receive power from an electrical grid. In some instances, voltage surges caused by various grid events, such as a high voltage ride-through grid event can damage various components of the wind turbine system and/or the pitch adjustment system if preventative action is not taken. Some pitch adjustment systems can include a dynamic braking device configured to suppress voltage surges associated with a grid event.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a wind pitch adjustment system associated with a wind turbine system. The system includes a power supply configured to convert an alternating current input signal into a direct current voltage. The system further includes a controller configured to receive a signal from the power supply and to provide one or more control commands to a pitch adjustment motor. The system further includes a surge stopping device comprising a switching element coupled between the power supply and the controller. The surge stopping device is configured to monitor an input voltage from a grid and to drive the switching element based at least in part on the monitored input voltage, such that the switching element is configured to block current flow through the switching element to the controller when the monitored input voltage is above a voltage threshold.

Another example aspect of the present disclosure is directed to a method of controlling a pitch adjustment system associated with a wind turbine system. The method includes receiving one or more signals indicative of a voltage provided by an electrical grid. The method further includes comparing the voltage provided by the electrical grid to one or more threshold voltages. The one or more threshold voltages are associated with a grid event associated with the electrical grid. The method further includes generating one or more control signals based at least in part on the comparison. The method further includes controlling operation of a surge stopping device based at least in part on the one or more control signals. The surge stopping device is coupled between a power supply associated with the voltage provided by the electrical grid, and a controller associated with the pitch adjustment system. The surge stopping device is configured to regulate current flow through the surge stopping device to the controller based at least in part on the one or more control signals.

Yet another example aspect of the present disclosure is directed to a wind turbine system. The wind turbine system includes a wind pitch adjustment system. The wind pitch adjustment system includes one or more rotor blades. The wind turbine system further includes one or more wind pitch adjustment systems. Each wind pitch adjustment system is configured to adjust a pitch angle of at least one of the one or more rotor blades. Each wind pitch adjustment system includes a power supply configured to convert an alternating current input signal into a direct current voltage, a controller configured to receive a signal from the power supply, and to provide one or more control commands to a pitch adjustment motor, and a surge stopping device comprising a switching element coupled between the power supply and the controller. The surge stopping device is configured to monitor an input voltage from a grid and to drive the switching element based at least in part on the monitored input voltage, such that the switching element is configured to block current flow through the switching element to the controller when the monitored input voltage is above a voltage threshold.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to controlling a wind pitch control system associated with a wind turbine system based at least in part on a grid voltage. For instance, a wind pitch control system can include a surge stopping device configured to regulate current flow to a controller associated with the wind pitch control system. The surge stopping device can include a switching element coupled between the controller and the grid. Operation of the switching element can be controlled based at least in part on the grid voltage. In particular, the surge stopping device can further include a comparator circuit configured to turn on a current source when the grid voltage exceeds a voltage threshold. The current source can control operation of the switching element. For instance, when the current source is turned on, the switching element can block current flow, and when the current source is turned off, the switching element can permit current flow. In this manner, the surge stopping device can permit current to flow through the surge stopping device to the controller when the grid voltage is less than the voltage threshold.

More particularly, the surge stopping device can include a direct current (DC) power supply, a comparator circuit, and a current source. The DC power supply can include a rectifier circuit configured to convert an alternating current (AC) input signal to an isolated DC voltage. The isolated voltage can be used to control operation of the switching element. In some implementations, the switching element can be a metal-oxide-semiconductor field-effect transistor (MOSFET). The comparator can be configured to monitor an input voltage from the grid, and to produce an output signal based at least in part on the input voltage. For instance, the comparator circuit can be configured to output a logic high signal when the input voltage is greater than a high threshold, and to output a logic low signal when the input voltage is less than a low threshold. In some implementations, the high threshold and the low threshold can be different values. For instance, the high threshold may be about 157 volts and the low threshold may be about 154. In such implementations, the comparator circuit may be configured using hysteresis techniques. As used herein, the term "about," when used in conjunction with a numerical value is intended to refer to within 40% of the numerical value.

The high and low thresholds can correspond to one or more grid events associated with the electrical grid. For instance, the grid event may be a high voltage ride-through (HVRT) grid event.

The output signal of the comparator circuit can be configured to drive the current source. For instance, when the output signal is a logic high signal, the current source can turn on, and when the output signal is a logic low signal, the current source can turn off. The current source can be coupled to the switching element. For instance, in implementations wherein the switching element is a MOSFET, the current source can be coupled to the gate of the switching element. In this manner, operation of the switching element can be controlled based at least in part on the current source. For instance, when the current source is turned on, the gate of the MOSFET can be pulled to ground, thereby turning off the MOSFET. When the current source is turned off, the MOSFET can be turned on.

In this manner, current can be provided to the pitch system controller through the surge stopping device (e.g., through the switching element) when the input voltage is less than the low threshold. When the input voltage is greater than the high threshold, the surge stopping device can block or reduce current flow to the controller through the surge stopping device. When the surge stopping device blocks current to the controller, power may be delivered to the controller via a flyback diode coupled between the DC bus and the control circuit. In particular, the wind pitch system may further include a capacitor bank including one or more capacitor devices. The capacitor bank may be configured to store energy, and to provide energy to the controller via the flyback diode when the switching element of the surge stopping device is turned off.

In some implementations, the comparator circuit of the surge stopping device may be configured to implement a reset process throughout which the comparator outputs a logic high output signal. For instance, the reset process may be implemented when the comparator circuit powers on and may last for a duration of about 20 milliseconds. For instance, the reset process may be implemented to eliminate or reduce contactor bouncing associated with the comparator circuit while the comparator circuit is powering on. In such implementations, the current source can be turned on for the duration of the reset process and the MOSFET can be turned off for the duration of the reset process.

In some implementations, the pitch adjustment system may further include a bypass contactor coupled to the DC bus. Operation of the bypass contactor can be controlled based at least in part on a system initialization process. In some implementations, the system initialization process may include a pre-charge process for the capacitor bank. In particular, during the system initialization process, the bypass contactor can be open, such that current in not permitted to flow through the bypass contactor. When the system initialization process is complete, the bypass contactor can be closed thereby allowing current to flow through the bypass contactor.

In some implementations, a dynamic braking resistor may be coupled to the bypass contactor. When the bypass contactor is closed, the dynamic braking resistor may suppress voltage surges associated with various grid events (e.g. HVRT events). In such implementations, the MOSFET of the surge stopping device may not be caused to turn off while the bypass contactor is closed.

Figure 1:
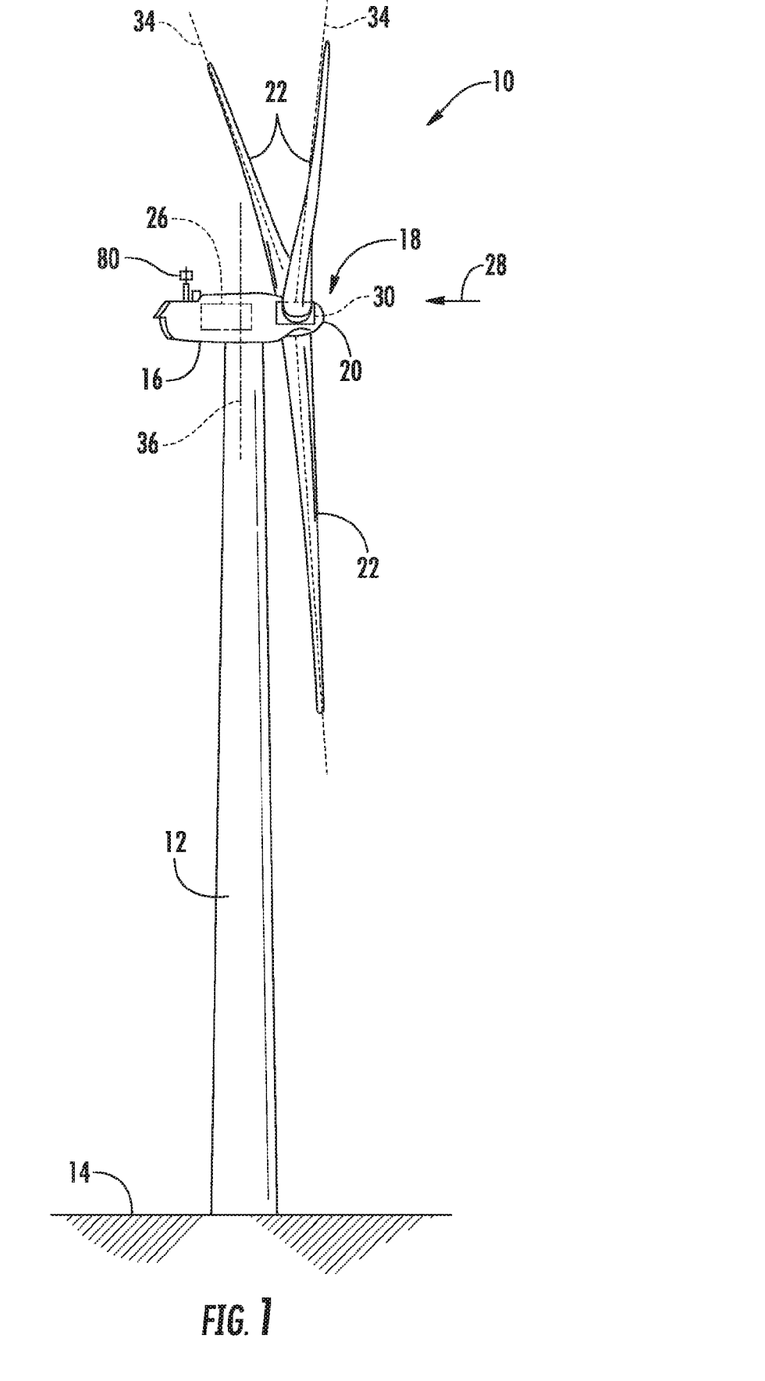
FIG. 1 depicts an example wind turbine system according to example embodiments of the present disclosure.

With reference now to the figures, example aspects of the present disclosure will be discussed in greater detail. For instance, FIG. 1 depicts a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a turbine control system including turbine controller 26 within the nacelle 16 or in another location associated with the wind turbine 10. In general, the turbine controller 26 may comprise one or more processing devices. Thus, in several embodiments, the turbine controller 26 may include suitable computer-readable instructions that, when executed by one or more processing devices, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

For example, the controller 26 may be configured to control the blade pitch or pitch angle of each of the rotor blades 22 (e.g. an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drivers or pitch adjustment mechanisms, such as pitch adjustment motor 32 (FIG. 2) of the wind turbine 10. In some implementations, each pitch adjustment motor 32 can be further controlled by an independent pitch adjustment system, such as pitch adjustment system 100 of FIG. 2. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment motors 32.

In particular, the pitch angle of the rotor blades 22 may be controlled and/or altered based at least in part on the direction 28 of the wind. For instance, the turbine controller 26 and/or a pitch adjustment controller, such as controller 106 of FIG. 2 may be configured to transmit a control signal/command to each pitch adjustment motor 32 such that one or more actuators (not shown) of the pitch adjustment motor 32 may be utilized to rotate the blades 22 relative to the hub 20.

Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism of the wind turbine 10 such that the nacelle 16 may be rotated about the yaw axis 30.

Still further, the turbine controller 26 may be configured to control the torque of a generator. For example, the turbine controller 26 may be configured to transmit control signals/commands to the generator in order to modulate the magnetic flux produced within the generator, thus adjusting the torque demand on the generator. Such temporary de-rating of the generator may reduce the rotational speed of the rotor blades, thereby reducing the aerodynamic loads acting on the blades 22 and the reaction loads on various other wind turbine 10 components.

Figure 2:
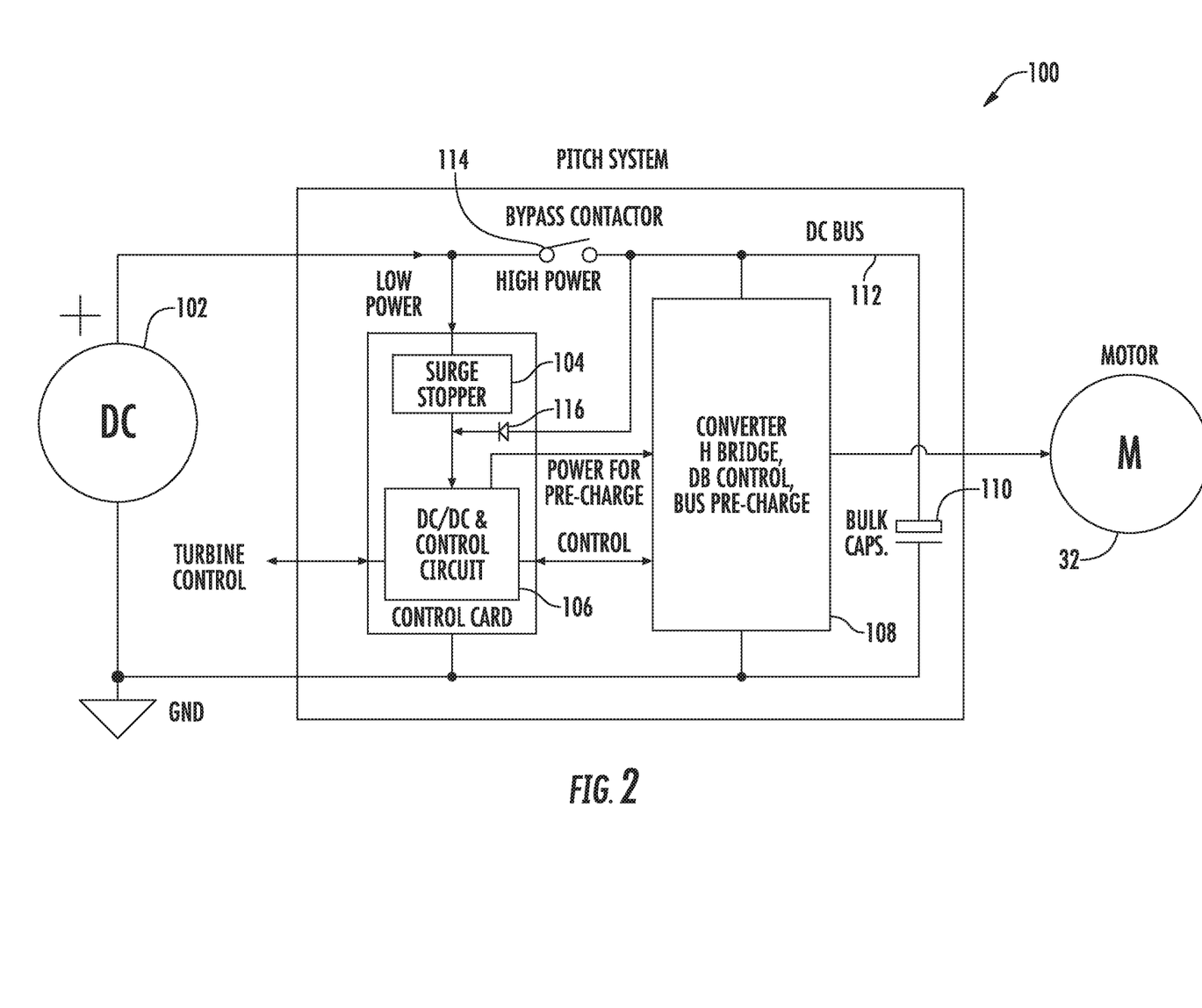
FIG. 2 depicts an example wind pitch adjustment system according to example embodiments of the present disclosure.

FIG. 2 depicts an overview of an example pitch adjustment system 100 according to example embodiments of the present disclosure. As shown, pitch adjustment system 100 is associated with a DC power supply 102. Power supply 102 can include a rectifier configured to receive a three-phase AC signal from an electrical grid, and to convert the AC signal to a DC signal. Power supply 102 can further be configured to provide the DC signal to pitch system 100 via a DC bus 112. System 100 can further include a surge stopping device 104 and a controller 106. Controller 106 can receive signals from a turbine controller, such as turbine controller 26, and provide control commands to pitch adjustment motor 36. As will be described in more detail with regard to FIG. 3, surge stopping device 104 can include a switching element configured to regulate current flow to controller 106.

System 100 can further include a converter 108. Converter 108 can be an H-bridge converter. Converter 108 can further include a pre-charging system for a capacitor bank 110 coupled to DC bus 112. Capacitor bank 110 can include one or more capacitor devices. Converter 108 can further include a dynamic braking device, such as a dynamic brake resistor. The dynamic brake resistor can be configured to suppress voltage in system 100 during a grid event (e.g. HVRT event). In this manner, a surge in voltage from the electrical grid may not damage pitch system 100.

Pitch system 100 further includes a bypass contactor 114 computed to DC bus 112. Bypass contactor 114 can be configured to regulate current flow to converter 108 and capacitor bank 110. In this manner, when bypass contactor 114 is turned on, the DC signal from supply 102 can flow through bypass contactor 114 to converter 108 and capacitor bank 110. In this manner, during a grid event while bypass contactor 114 is closed, the dynamic brake resistor can be configured to suppress the voltage surge from the electrical grid.

When bypass contactor 114 is open, current will not flow through bypass contactor 114 and the dynamic brake resistor will not suppress a surge voltage caused by a grid event. In such instances, surge stopping device 104 can be configured to detect the DC signal from power supply 102, and to regulate current flow to controller 106 based at least in part on the detected signal. In particular, as indicated, surge stopping device 104 can include a switching element coupled between power supply 102 and controller 106.

Operation of the switching element can be controlled based at least in part on the DC signal from power supply 102. For instance, the switching element can be configured to permit current flow when the detected voltage signal is greater than a threshold voltage. In some implementations, the switching element can be configured to block current flow when the detected voltage signal is less than a threshold voltage. In some implementations, the threshold voltage can be a threshold range. For instance, the switching element can be configured to open when the detected voltage exceeds the highest value in the threshold range, and the switching element can be configured to close when the detected voltage is less than the lowest value in the threshold range.

Pitch system 100 further includes a flyback diode 116 coupled between DC bus 112 and controller 108. Flyback diode 116 can be configured to provide power to controller 106 when surge stopper 104 is open, and is thereby blocking current flow to controller 106. In such instances, capacitor bank 110 can supply power to controller 106 via flyback diode 116. In this manner, controller 106 can still receive power during a grid event while bypass contactor 114 is open.

In some implementations, operation of bypass contactor 114 can be controlled based at least in part on a system initialization process. For instance, in some implementations, the system initialization process can correspond to a "powering on" process by pitch system 100. During such system initialization process, bypass contactor 114 can be operated in an open state. Bypass contactor 114 can then be closed responsive to the completion of the system initialization process.

Figure 3:
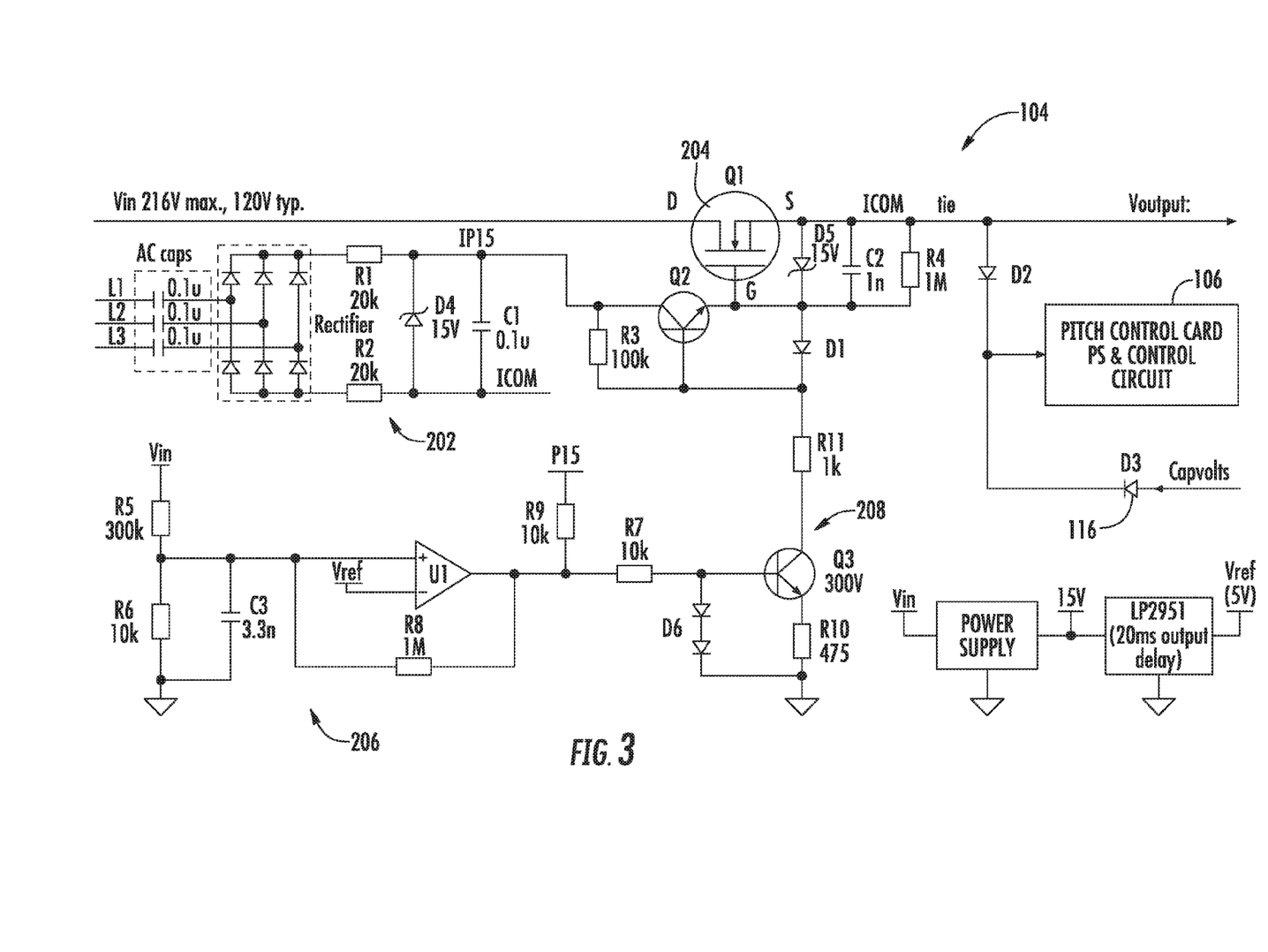
FIG. 3 depicts an example surge stopping device associated with a wind pitch adjustment system according to example embodiments of the present disclosure.

FIG. 3 depicts an overview of an example surge stopping device 104 according to example embodiments of the present disclosure. Surge stopping device 104 includes a power supply 202, a switching element 204, a comparison circuit 206, and a current source 208. Power supply 202 can be a step down power supply. Power supply 202 includes AC capacitors (AC caps), and a rectifier. The rectifier can be a full-wave rectifier. Power supply 202 further includes resistors R1, R2, diode D4 and capacitor C1. In particular, power supply 202 can be configured to generate an isolated DC signal (IP15). In some implementations, the isolated DC signal can be about 15 volts.

Comparison circuit 206 includes a comparator U1, resistors R5, R6, and R8, and a capacitor C3. As indicated, comparison circuit 206 can be configured to receive an input signal (e.g. $V_{in}$), and to produce an output signal based at least in part on the input signal. For instance, comparison circuit 206 can be configured to produce a logic high signal when $V_{in}$ is greater than a threshold (e.g. about 157 volts) and to produce a logic low signal when $V_{in}$ is less than a threshold (e.g. about 154 volts). In some implementations, comparator U1 can be configured to compare an input voltage with a reference voltage ($V_{ref}$) to determine the output signal.

The output signal of comparison circuit 206 can be configured to drive operation of current source 208. Current source 208 can include transistor Q3, resistors R7, R9, R10, and diodes D6. In particular, operation of transistor Q3 can be controlled at least in part by the output signal of comparison circuit 206. In this manner, transistor Q3 can be configured to turn on when comparison circuit 206 outputs a logic high signal, thereby causing current source 208 to produce a current. For instance, in some implementations, current source 208 can produce a current of about 1 milliamp. Transistor Q3 can be configured to turn off when the comparison circuit 206 outputs a logic low signal. In such instances, no current will be produced by current source 208.

Switching element 204 can be configured to regulate current flow through surge stopping device 104, for instance, to a controller, such as controller 106. As shown, switching element 204 can be a MOSFET device. In particular, current source 208 can be used to pull the gate of switching element 204 to ground, thereby turning switching element 204 off. For instance, when current source 208 produces a current, switching element 204 can be configured to turn off, thereby blocking current flow through switching element 204. When current source 208 does not produce a current, operation of switching element 204 can be controlled by power supply 202 and a transistor Q2. In particular, when current source 208 produces a current, the base-emitter voltage of transistor Q2 can be negative biased, thereby turning transistor Q2 off. Switching element 204 can then be negative biased by diode D5, thereby turning switching element 204 off. When current source 208 does not produce a current, transistor Q2 can be turned on by power supply 202, thereby turning switching element 204 on.

As described above, surge stopping device 104 can be coupled to controller 106. Accordingly, when switching element 204 is turned on, current can flow through switching element 204 to controller 106. When switching element 204 is turned off, switching element 204 can block current flow to controller 106. In such instances, power can be provided to controller 106 by a capacitor bank, such as capacitor bank 110 through a flyback diode 116. In this manner, power can still be provided to controller 106 even when switching element 204 is turned off.

It will be appreciated that the configuration of the surge stopping device depicted in FIG. 3 is for illustrative purposes only. In particular, it will be appreciated that various other suitable circuit configurations can be used without deviating from the scope of the present disclosure. For instance, surge stopping device 104 can be configured to include various other components, devices, or parts without deviating from the scope of the present disclosure.

Figure 4:
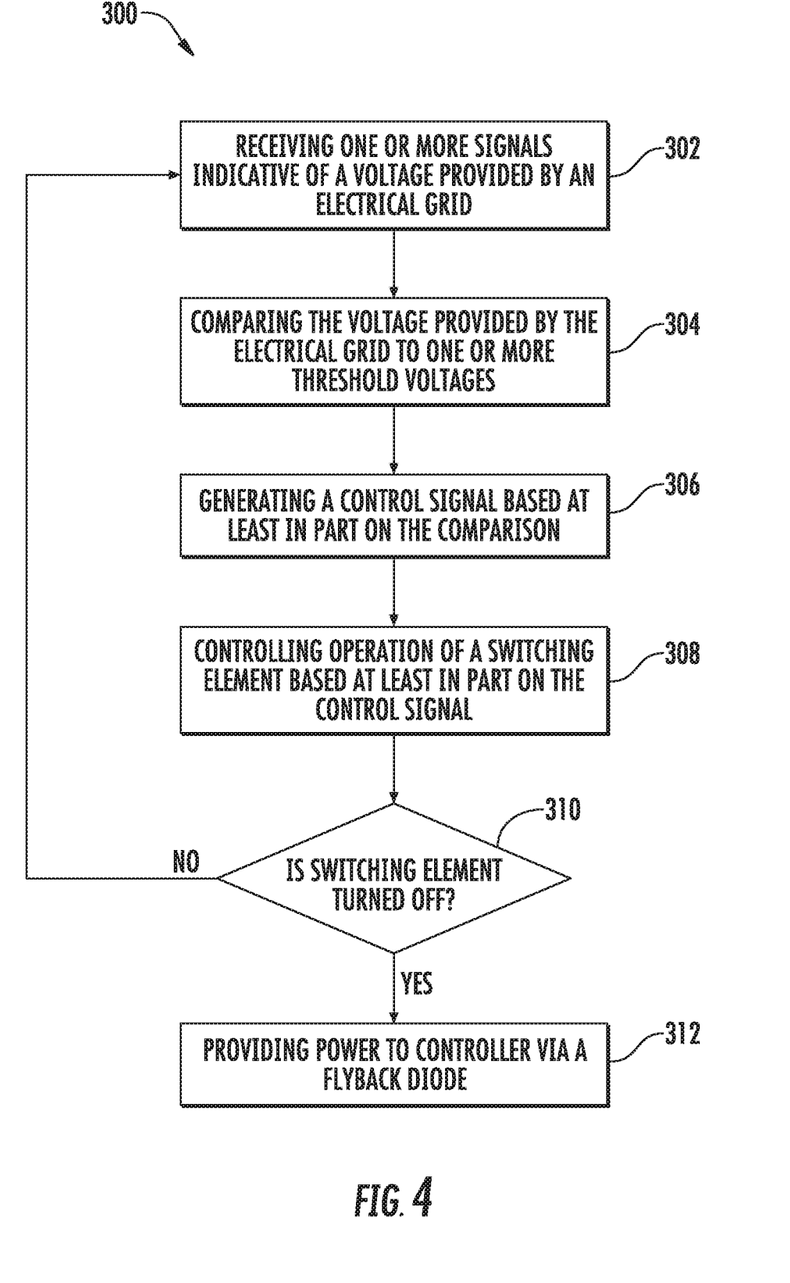
FIG. 4 depicts a flow diagram of an example method of controlling a wind pitch adjustment system according to example embodiments of the present disclosure.

FIG. 4 depicts a flow diagram of an example method (300) of controlling operation of a pitch adjustment system according to example embodiments of the present disclosure. For instance, in some implementations, method (300) can be implemented by one or more of the devices of FIGS. 2 and/or 3. In addition, FIG. 4 depicts steps performed in a particular order for purposes of illustration and discussion. Those of ordinary skill in the art, using the disclosures provided herein, will understand that various steps of any of the methods disclosed herein can be omitted, rearranged, expanded, and/or adapted in various ways without deviating from the scope of the present disclosure.

At (302), method (300) can include receiving one or more signals indicative of a voltage provided by an electrical grid. For instance, the electrical grid can provide a voltage to a pitch adjustment system associated with a wind turbine system. As indicated above, the pitch control system can include a surge stopping device, a controller, a converter device (e.g. DC/DC converter), and a capacitor bank. The pitch adjustment system can be configured to provide control commands to a pitch adjustment motor.

At (304), method (300) can include comparing the voltage provided by the electrical grid to one or more threshold voltages. In particular, the one or more threshold voltages can be indicative of a grid event associated with the electrical grid, such as an HVRT grid event. In some implementations, the one or more threshold voltages can include a high threshold (e.g. about 157 volts) and a low threshold (e.g. about 154 volts). The one or more thresholds can correspond to operation of a switching element (MOSFET device) associated with the surge stopping device. As indicated, the switching device can be coupled between a power supply and the pitch adjustment system controller.

At (306), method (300) can include generating a control signal based at least in part on the comparison. For instance, the control signal can be a logic high signal or a logic low signal. In some implementations, the control signal can be a logic high signal when the voltage provided by the electrical grid is greater than the high threshold. In some implementations, the control signal can be a logic low signal when the voltage provided by the electrical grid is less than the low threshold.

At (308), method (300) can include controlling operation of the switching element based at least in part on the control signal. For instance, when the control signal is a logic low signal, the switching element can be configured to permit current flow through the switching element (e.g. turn on). When the control signal is a logic high signal, the switching element can be configured to block current flow through the switching element. In this manner, current flow through the switching element to the controller can be regulated based at least in part on the voltage provided by the electrical grid.

At (310), method (300) can include determining whether the switching device is turned off. If the switching device is turned off, method (300) can include providing power to the controller via a flyback diode (312). In some implementations, the power can be provided by a pre-charged capacitor bank associated with the pitch adjustment system. For instance, the capacitor bank can be configured to store energy, and to provide at least a portion of the stored energy to the controller when the switching element is turned off. In this manner, power can still be provided to the controller even when current flow to the controller is blocked by the surge stopping device. Returning back to (310), if the switching device is not turned off, method (300) can return to (302).

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind pitch adjustment system associated with a wind turbine system, the wind pitch adjustment system comprising:
    a power supply configured to convert an alternating current input signal into a direct current voltage;
    a controller configured to receive a signal from the power supply, and to provide one or more control commands to a pitch adjustment motor; and
    a surge stopping device comprising a switching element coupled between the power supply and the controller, the surge stopping device configured to monitor an input voltage from a grid and to drive the switching element based at least in part on the monitored input voltage, such that the switching element is configured to block current flow through the switching element to the controller when the monitored input voltage is above a voltage threshold;
    a bypass contactor coupled to the power supply; and
    a dynamic brake resistor configured to suppress a voltage from the grid based at least in part on operation of the bypass contactor and the surge stopping device.

2. The wind pitch adjustment system of claim 1, wherein the voltage threshold corresponds to a high voltage ride-through grid event.

3. The wind pitch adjustment system of claim 1, wherein the surge stopping device further comprises a comparison circuit configured to compare the monitored input voltage to a reference voltage and to provide a comparison output signal based at least in part on the comparison.

4. The wind pitch adjustment system of claim 3, wherein the surge stopping device further comprises a current source, and wherein operation of the current source is controlled based at least in part on the comparison output signal.

5. The wind pitch adjustment system of claim 4, wherein the current source is configured to turn on when the comparison output signal is a logic high signal, and wherein the current source is configured to turn off when the comparison output signal is a logic low signal.

6. The wind pitch adjustment system of claim 5, wherein the current source is configured to control operation of the switching element, such that when the current source is turned off, current is permitted to flow through the switching element.

7. The wind pitch adjustment system of claim 1, wherein the surge stopping device further comprises a second switching element coupled between the power supply and the switching element.

8. The wind pitch adjustment system of claim 1, wherein the power supply comprises a rectifier configured to receive the alternating current input signal and to generate an isolated direct current voltage.

9. The wind pitch adjustment system of claim 1, wherein the operation of the bypass contactor is controlled based at least in part on a system initialization process associated with the wind pitch adjustment system.

10. The wind pitch adjustment system of claim 9, wherein the bypass contactor is controlled such that current is permitted to flow through the bypass contactor subsequent to the system initialization process.

11. The wind pitch adjustment system of claim 10, wherein the dynamic brake resistor is configured to suppress the voltage from the grid during a high voltage ride-through grid event based at least in part on operation of the bypass contactor.

12. The wind pitch adjustment system of claim 1, further comprising a capacitor bank comprising one or more capacitors configured to store energy.

13. The wind pitch adjustment system of claim 12, further comprising a flyback diode coupled between the power supply and the controller, such that power is delivered from the capacitor bank to the controller via the flyback diode when the surge stopping device is turned off.

14. A method of controlling a pitch adjustment system associated with a wind turbine system, the method comprising:
    receiving one or more signals indicative of a voltage provided by an electrical grid;

comparing the voltage provided by the electrical grid to one or more threshold voltages, the one or more threshold voltages being associated with a grid event associated with the electrical grid;

generating one or more control signals based at least in part on the comparison;

controlling operation of a surge stopping device based at least in part on the one or more control signals, the surge stopping device being coupled between a power supply associated with the voltage provided by the electrical grid, and a controller associated with the pitch adjustment system, the surge stopping device configured to regulate current flow through the surge stopping device to the controller based at least in part on the one or more control signals; and controlling a dynamic brake resistor configured to suppress a voltage from the grid based at least in part on operation of a bypass contactor and the surge stopping device.

15. The method of claim 14, wherein controlling operation of a surge stopping device comprises controlling operation of a switching element associated with the surge stopping device, and wherein the method further comprises:

determining whether the switching element is turned off; and when the switching element is turned off, providing power to the controller via a flyback diode coupled to the controller.

16. The method of claim 14, further comprising:

determining whether the bypass contactor associated with the pitch adjustment system is closed; and when the bypass contactor is closed, controlling operation of the dynamic braking device based at least in part on the voltage provided by the electrical grid.

17. A wind turbine system comprising:

one or more rotor blades; and one or more wind pitch adjustment systems, each wind pitch adjustment system configured to adjust a pitch angle of at least one of the one or more rotor blades, each wind pitch adjustment system comprising:

a power supply configured to convert an alternating current input signal into a direct current voltage;

a controller configured to receive a signal from the power supply, and to provide one or more control commands to a pitch adjustment motor; and a surge stopping device comprising a switching element coupled between the power supply and the controller, the surge stopping device configured to monitor an input voltage from a grid and to drive the switching element based at least in part on the monitored input voltage, such that the switching element is configured to block current flow through the switching element to the controller when the monitored input voltage is above a voltage threshold;

a bypass contactor coupled to the power supply; and a dynamic brake resistor configured to suppress a voltage from the grid based at least in part on operation of the bypass contactor and the surge stopping device.

18. The wind turbine system of claim 17, wherein the surge stopping device further comprises a comparison circuit configured to compare the monitored input voltage to a reference voltage and to provide a comparison output signal based at least in part on the comparison.

19. The wind turbine system of claim 18, wherein the surge stopping device further comprises a current source, and wherein operation of the current source is controlled based at least in part on the comparison output signal.

20. The wind turbine system of claim 19, wherein the current source is configured to turn on when the comparison output signal is a logic high signal, and wherein the current source is configured to turn off when the comparison output signal is a logic low signal.

* * * * *